(12) United States Patent
Fackler et al.

(10) Patent No.: US 9,487,549 B2
(45) Date of Patent: *Nov. 8, 2016

(54) PREPARATION OF LIGNIN

(75) Inventors: Karin Fackler, Vienna (AT); Thomas Ters, Vienna (AT); Ortwin Ertl, Graz (AT); Kurt Messner, Vienna (AT)

(73) Assignee: Annikki GmbH, Graz (AT)

( * ) Notice: Subject to any disclaimer, the term of this patent is extended or adjusted under 35 U.S.C. 154(b) by 0 days.

This patent is subject to a terminal disclaimer.

(21) Appl. No.: 13/820,319

(22) PCT Filed: Sep. 1, 2011

(86) PCT No.: PCT/AT2011/000357
§ 371 (c)(1),
(2), (4) Date: Apr. 30, 2013

(87) PCT Pub. No.: WO2012/027767
PCT Pub. Date: Mar. 8, 2012

(65) Prior Publication Data
US 2013/0217868 A1 Aug. 22, 2013

(30) Foreign Application Priority Data
Sep. 2, 2010 (AT) ................ A 1476/2010

(51) Int. Cl.
*C07G 1/00* (2011.01)

(52) U.S. Cl.
CPC ...................... *C07G 1/00* (2013.01)

(58) Field of Classification Search
CPC ........................................................ C07G 1/00
USPC .................... 530/507; 435/72; 536/128
See application file for complete search history.

(56) References Cited

U.S. PATENT DOCUMENTS

| | | | |
|---|---|---|---|
| 4,395,543 A | 7/1983 | Wang et al. | |
| 4,908,098 A | 3/1990 | DeLong et al. | |
| 5,777,086 A | 7/1998 | Klyosov et al. | |
| 2009/0062516 A1 | 3/2009 | Belanger et al. | |
| 2010/0159522 A1 | 6/2010 | Cirakovic | |
| 2012/0094331 A1* | 4/2012 | Fackler et al. | 435/72 |
| 2013/0078677 A1* | 3/2013 | Fackler et al. | 435/99 |
| 2013/0217869 A1* | 8/2013 | Ters et al. | 530/507 |

FOREIGN PATENT DOCUMENTS

| | | |
|---|---|---|
| DE | 19702769 A1 | 1/1997 |
| WO | WO 82/01568 | 5/1982 |
| WO | WO 96/41052 | 12/1996 |
| WO | WO 98/42912 | 10/1998 |
| WO | WO 2007/111605 | 10/2007 |
| WO | WO 2007/129921 | 11/2007 |
| WO | WO 2010124312 A2 * | 11/2010 |
| WO | WO 2011014894 A2 * | 2/2011 |

OTHER PUBLICATIONS

Hergert, "Developments in Organosolv Pulping—An Overview", Environmentally Friendly Technologies for the Pulp and Paper Industry; 1998, pp. 5-68.
Avgerinos et al., "Selective Solvent Delignification for Fermentation Enhancement", Biotechnologies and Bioengineering, vol. XXV, 1983, pp. 67-83.
Marton et al., "Ethanol-alkali pulping", Tappi, Jun. 1982, vol. 65, No. 6, pp. 103-106.
Ivanow et al., "Delignification du bois de charme par solvolyse alcaline", Papeterie No. 132, Sep. 1989, pp. 22-27.
Arato, E.K. Pye, G. Gjennestad, 2005, The Lignol approach to biorefining of woody biomass to produce ethanol and chemicals; Appl. Biochem. Biotechnol., vol. 121-12:871-882.
Beckmann et al., 1921, Lignin aus Winterroggenstroh; Zeitschrift für angewandte Chemie 34:285-288.
El-Sakhawy et al., 1996a: Organosolv pulping, (3), ethanol pulping of wheat straw; Cellul Chem Technol 30:281-296.
Lawther, et al., Isolation and Characterization of organosolv lignin under alkaline condition from wheat straw; Int. J. of Polymer Analysis and Characterization, 3:2, (1997) 159-175.
Lora et al., Soda pulping of agricultural fibres for boardmaking application; Paper Technology, May 2000, 37-42.
Nakano et al., Studies on alkali-methanol cooking; Proc. of Ekman Days, 1981, vol., pp. 72-77, Stockholm, Sweden.
Patt et al., The ASAM Process; In: R.A. Young and M. Akhtar, Environmentally friendly technologies for the pulp and paper industry; John Wiley & Sons, Inc., New York, 1998, 101-132.
Philips et al., The Chemistry of Lignin; IX; Lignin from barley straw; J. Am. Chem. Soc., 56,2707 (1934).
Shatalow et al., Kinetics of polysaccharide degradation during ethanol-alkali delignification of giant reed—Part 1; Cellulose and xylan; Carbohydrate Polymers, 59, 2005, 435-442.
Sixta et al., New generation Kraft processes, The 2nd Nordic Wood Biorefinery Conference, Helsinki, Finland, Sep. 2-4, 2009, 53-66.
Technical report NREL/TP-510-46214, Aug. 2009.
Tomani et al., The Lignoboost Process, NWBC-2009 The 2nd Nordic Wood Biorefinery Conference, Helsinki, Finland, Sep. 2-4, 2009, 181-188.

* cited by examiner

Primary Examiner — Liam J Heincer
Assistant Examiner — Nicholas Hill
(74) Attorney, Agent, or Firm — Greenberg Traurig, LLP

(57) ABSTRACT

A method for the preparation of lignin from lignocellulosic material by pulping with alcohol, in particular with a $C_{1-4}$ alcohol, water and a base, in particular NaOH, at a temperature below 100° C., in particular from 40° C. to 90° C., in particular from 50° C. to 70° C., characterized in that 3 to 12 parts of base, in particular 4 to 10 parts of base, in particular preferable 5 to 8 parts of base, are used per 100 parts of the dry lignocellulosic material to be pulped.

18 Claims, No Drawings

PREPARATION OF LIGNIN

RELATED APPLICATIONS

This application is a national phase filing under 35 U.S.C. 371 of International Application No. PCT/AT2011/000357, filed on Sep. 1, 2011, which claims the benefit of Austrian Patent Application No. A 1476/2010 filed on Sep. 2, 2010, the entirety of these applications is hereby incorporated herein by reference for the teachings therein.

The present invention relates to a method for the preparation of lignin from lignocellulosic material by pulping with alcohol, in particular with a $C_{1-4}$ alcohol, water and a base.

In connection with the shortage of crude oil, the renewable resource lignocellulose (straw, wood, paper waste, etc.) has been gaining more and more importance as a starting material for chemical products and fuels. Lignocellulose consists of the ultra-structurally cross-linked polymeric main components cellulose, hemicellulose and lignin, frequently accounting for about 85-90% of the raw material. The remaining amount may be summarized under the term extract materials.

The digestion of the components present as polymers and the separation thereof into individual product flows as well as the further processing thereof into high-order products is the task of biorefineries. Herein, only biorefineries of the biochemical platform are to be mentioned. The rentability of such biorefineries is largely dependent on the value creation on the basis of the product flows. This, in turn, is significantly influenced by the purity of the individual product flows, as downstream separation processes may be rather difficult and expensive. Hence, a process may be considered ideal, wherein the digestion of the individual main components is realized as selectively as possible. Apart from the use of the carbohydrate portion, also the amount and the quality of the obtained lignin exert a strong influence on the value creation of the entire process. Lignin is steadily gaining economic importance as a substitute for petrochemically produced aromatics.

Biorefineries may pursue their individual aims, which are defined by the respective chemical principle of pulping and the level of selectivity obtained therewith. As examples there may be mentioned the production of bioalcohol and the preparation of pulp.

In the production of bioalcohol the methods of pulping and separation have to meet the lowest requirements. The main objective is to improve the accessibility of the substrate for the cellulase and hemicellulase enzyme complexes in order to hydrolytically release the sugars necessary for the production of ethanol. This may be achieved already by means of weak delignification with partly depolymerisation of the hemicellulose through so-called steam explosion procedures. For example in the autohydrolysis process of straw, developed by DONG, DK, the hemicellulose is dissolved at temperatures near 200° C. and with the help of the acetic acid digested therein to an extent of ⅔ and then used as feedstuff. The cellulose and the residual hemicellulose may then be fermented upon enzymatic hydrolysis into ethanol. Lignin is plasticized, condenses to droplets and is then unsuitable for any further chemical use. It serves as thermal energy source. In other similar methods (ENREL, IOGEN, SEKAB) there is added acid in order to increase the level of pulping and, hence, the yield of ethanol (*Technical report NREL/TP*-510-46214, August 2009).

In processes for the preparation of pulp, the selectivity of the pulping method has to meet significantly higher requirements. It aims at a delignification as high as possible with a loss of stiffness of the pulp and a loss of hemicellulose as little as possible in order to achieve high yields. This objective is mainly achieved by means of alkaline methods.

One of the oldest methods, still applied to a small extent for the preparation of pulp from straw, is the soda method, wherein straw is pulped with sodium hydroxide slightly below 100° C. (J. H. Lora & E. Escudero, 2000, *Soda pulping of agricultural fibres for boardmaking application; Paper Technology*, May 2000, 37-42). Due to some negative features of straw in comparison with wood (seasonal occurrence, storability, short fibres, dehydration characteristics), the possibilities of use are rather limited. In the course of the growing economical importance of lignin as a substitute for petrochemically produced aromatics, there was developed by Granit a method for the preparation of lignin following pressure cooking in sodium hydroxide, wherein the lignin, which otherwise cannot be filtrated upon acid precipitation, may be separated and prepared by means of subsequent heating and ageing (A. Abaecherli, F. Doppenberg, 2003, Method for preparing alkaline solutions containing aromatic polymers, EP0970275 (B1)). The smouldering-free lignin is available under the trade name Protobind.

The widest known alkaline pulping method is the sulphate or "Kraft" process, wherein there is pulped with sodium hydroxide and sodium sulphite. The process is carried out at 170° C. using high NaOH concentrations (18-24% based on wood TG for pulp with Kappa of about 5) and is optimized in regard to the production of tearproof pulp material of light colour. The sulphate lignin developing thereby is in part rather high-condensed by repolymerisation reactions in the course of the cooking process, and it furthermore contains about 2% sulphur, this restricting its range of application as a chemical raw material rather significantly. By the recently developed Lignoboost process (P. Tomani, 2009, *The Lignoboost Process, NWBC-2009 The 2$^{nd}$ Nordic Wood Biorefinery Conference,* Helsinki, Finland, Sep. 2-4, 2009, 181-188.) the lignin is precipitated and has mainly thermal use, i.e. for the recovery of chemicals.

The second largest source for technical lignins is the sulphate pulp method, wherein wood is predominately pulped at an acid pH value with Ca or Mg sulphite. The lignosulphonate resulting therefrom is also condensed and sulphurous, it is, however, due to its solubility in water, suitable for a larger range of applications.

A disadvantage of alkaline methods, which is especially noticeable at high temperatures, is that various reactions of degradation of the carbohydrates take place. In the case of high alkalinity, already at about 100° C. there is realized an intensive degradation of the hemicellulose, and simultaneously there is started the so-called peeling reaction, which introduces in turn a degradation of the cellulose and the hemicellulose from the reducing end and increases with increasing temperature. At a high temperature there is then carried out a hydrolytic digestion of the glycoside bonds of the carbohydrates (D. Fengel, G. Wegener, 1984, *Wood, Chemistry, Ultrastructure, Reactions*; Walter de Gruyter, Berlin). This undesired side reaction may be suppressed by anthrachinone as well as alcohol. (Nakano et al., 1981, *Studies on alkali-methanol cooking; Proc. Of Ekman Days,* 1981, Vol., pp. 72-77, Stockholm, Sweden) have demonstrated that alcohol in its function as scavenger radical prevents induced degradation reactions and, in this way, improves the stability of the cellulose in alkaline-alcoholic systems. Xylan constitutes the majority of the hemicellulose of grasses and straw. This protection reaction, which is otherwise also directed at the xylan, did not take place in the initial phase of the sodium hydroxide—pulp cooking of reed grass (*Arundo donax*) (conditions: 130° C.-150° C., NaOH 25%, based on the substrate dry weight, ethanol:water=40:60, ratio liquid:solid=6:1) (A. A. Shatalow and H. Pereira, 2005, *Kinetics of polysaccharid degradation during ethanol-alkali delignification of giant reed—Part 1*; *Cellulose and xylan; Carbohydrate Polymers*, 59, 435-442). At these temperatures, about 55% of the xylan was already degraded in the initial phase of the cooking process with a similar rate as lignin. The protection function applied only to the second half of the xylan. The depolymerised portion of xylan is then further digested into sugars at high alkalinity and temperature subsequently by means of hydrolysis and peeling reactions. In the case of high NaOH concentration and temperatures exceeding 100° C., there also takes place a significant coupling of the lignin degradation to the xylan degradation, this leading to cooking liquors containing the degradation products of both components.

Anthrachinone is used in improved soda processes (H. Sixta, G. Schild, 2009, *New generation Kraft processes, The 2$^{nd}$ Nordic Wood Biorefinery Conference*, Helsinki, Finland, Sep. 2-4, 2009, 53-66) for the protection of the cellulose. In the ASAM process, wherein the wood is cooked at 180° C. with alkali and sulphite, under addition of anthrachinone and methanol, it was attempted to make use of both principles (R. Patt, O. Kordsachia, H.-L. Schubert, 1998, *The ASAM Process*; In: R. A. Young and M. Akhtar, *Environmentally friendly technologies for the pulp and paper industry*; John Wiley & Sons, Inc., New York, 101-132). The results clearly demonstrate that even if making use of methanol and anthrachinone it was not possible to decouple the production of lignin from the degradation of hemicellulose. When coniferous wood was cooked, there were still released 30% xylan and 80% mannan. The ASAM process has never been used in an industrial scale.

Currently, there are made great efforts to expand pulp factories into biorefineries and to prepare, apart from the main product pulp, also side products such as lignin, xylose, acetic acid or furfural, originating in the non-specific degradation of the xylan, from the cooking liquor. There are also reinvestigated methods, which have not proven as competitive for the pulp production due to various reasons, on their efficiency as biorefineries, wherein there have to be met different requirements.

Whereas pulp cooking processes aim at a delignification as high as possible while maintaining the quality of the fibres and in this way accept chemical conversions of hemicellulose digestion products as well as condensation reactions of the lignin, the ideal biorefinery process has the objective to prepare the main components of the lignocellulose and in particular the lignin or its digestion products, respectively, in a condition as native as possible. Furthermore, the biorefinery processes—in contrast to the pulp cooking processes already mentioned, wherein all digestion products accrue together in the cooking liquor—aim at preparing the lignocellulose main components or digestion products thereof, respectively, in separated fractions. As chemical reactions in the digestion of lignocellulose are always associated with undesired side reactions, it should be the objective of an ideal biorefinery to keep these side reactions as low as possible.

The success of the use of enzymes for the pulping of the lignocellulose is in fact restricted by two factors. Firstly, the conversion rate of hydrolytic enzymes on native lignocellulose is rather low due to its high molecular weight and the low diffusion rate associated therewith. This has the consequence that there has to be carried out a first step of loosening up the lignocellulose complex, associated with an increase of the porosity of the substrate. This may only be realized by the chemical depolymerisation and subsequent extraction of a certain amount of lignocellulose components. As cellulose constitutes the component to be dissolved the hardest, there may be chosen for the first pulping step between the hemicellulose and/or the lignin, wherein, as stated above, this pulping step has to be as selective as possible. The various biorefinery concepts substantially differ in the choice of the chemical principle for carrying out this first step and the hence inevitable consequences for the further preparation of the product flows.

Recently, there have again been taken up organosolv processes as biorefinery concepts. These were developed in the 1980ies, when there have been made efforts to substitute chloro as a bleaching chemical for more environmentally friendly chemicals, which, however, did not have the same delignification features. At that time, there were developed strategies for "extended cooking", which was essentially based on the integration of organic solvents in the cooking process, thereby increasing the level of delignification and decreasing the bleaching efforts. As solvents there were primarily used alcohols such as ethanol or methanol, which were mainly supposed to increase the solubility of the lignin, whereas also further on acids, alkali, sulphite or sulphide or oxidative reactions acted as the digestive chemicals proper (H. Hergert, 1998, *Developments in organosolv pulping*; In: R. A. Young and M. Akhtar, *Environmentally friendly technologies for the pulp and paper industry*; John Wiley & Sons, Inc., New York, 5-68). These processes have not proven suitable for the preparation of pulp, they are, however, concurrently considered anew as biorefinery processes.

In general, there may be distinguished between two types of organosolv processes: acid and alkaline ones.

An acid process is, for example, the Allcell process, which has been adopted and further developed by the company LIGNOL (C. Arato, E. K. Pye, G. Gjennestad, 2005, *The Lignol approach to biorefining of woody biomass to produce ethanol and chemicals; Appl. Biochem. Biotechnol.*, Vol. 121-12:871-882). As substrates there is processed wood, straw, bagasse. The fundamental chemical reaction is the autohydrolytical digestion of hemicellulose at a pH value of 3.8-2.0, a result of the acetic acid digested from xylan (conditions: 180-195° C., ethanol concentration 35-70%, ratio liquid:solid from 4:1 to 10:1, reaction duration of 30-90 minutes). Thereby, there is in part digested cellulose in the form of insoluble oligosaccharides, and the majority of the hemicellulose is digested into oligo- and monosaccharides. A part of the pentoses is oxidised into furfural under the reaction conditions. Lignin is also in part hydrolysed and accrues with the other degradation products in the cooking liquor, from which there may then be obtained the degradation products. The other not hydrolysed part remains in the solid and is enzymatically hydrolysed to sugars and fermented to ethanol. The lignin remaining in the solid (20-25% of the original) accrues as fermentation residue and may only be burnt.

A similar acid organosolv biorefinery process for the pulping of wood is being developed in Germany (*Pilot project "Lignocellulose-Bioraffinerie" Gemeinsamer Schlussbericht zu den wissenschaftlichen Ergebnissen aller Teilvorhaben*).

From FIGS. 4-30, page 215, there may be recognized that without the addition of sulphuric acid, there are degraded 68% of the lignin and 77.5% of the hemicellulose or, with addition of 1% sulphuric acid, 64% of the lignin and 70% of the hemicellulose from the raw material, respectively, and dissolved together. Furthermore, this common partial flow in addition contains furfural as hemicellulose degradation product. The remaining solid still contains 32% or 36%, respectively, of the original lignin and 22.5% or 30%, respectively, of the hemicellulose.

In summary, there is to be stated that in the case of acid processes the amount of lignin obtained is relatively small, on the one side, and that the lignin degradation cannot be decoupled from the hemicellulose degradation. Due to the rather weak lignin degradation, there is developed a fibre material with a residual lignin content, which would require substantial bleaching efforts in the case of being used as chemical raw material and which is unsuitable for this application. There is primarily aimed at the use of a raw material for the production of bioalcohol.

In the past, alkaline organosolv processes have been substantially less investigated than acid ones, as there have to be meet high-order technical requirements in regard to the sodium hydroxide recovery if large amounts of sodium hydroxide are used, in particular if straw is used as a substrate (i.e., Marton & Ganzow 1982, Use of ethanol in alkaline pulping; WO 82/01568).

In Germany in the 1990ies, there was developed the organocell process for pulp cooking up to an industrial use and application (N. Zier, 1996, *Strukturelle Merkmale eines Organosolv-Lignins bei Variation der Parameter; Dissertation Technische Universität Dresden*). The process consists of 2 phases, starting with an impregnation of alcohol-water (30:70) at 110-140° C. and followed by a cooking process at 165-170° C. with the addition of NaOH 30% and anthrachinone 0.1%, based on the dry weight of the substrate. The process was suitable for the pulping of deciduous and coniferous trees as well as annual plants. The quality of the pulp was comparable to that of Kraft pulp and could be bleached with oxygen. According to various reports, the plant was closed shortly after start-up due to technical problems, which in part were associated with the recovery of the high amount of sodium hydroxide (El-Sakhawy et al., 1996a: *Organosolv pulping*, (3), *ethanol pulping of wheat straw; Cellul Chem Technol* 30:281-296).

For a profitable biorefinery process, aiming not at the production of bioalcohol but rather the use of all main components of the lignocellulose as chemical or material resources, it is necessary to the obtain a portion of the present lignin as large as possible. This is to be carried out in a uniform product flow with only little contamination by degradation products from other components.

If wood pulping is based on the degradation of hemicellulose by means of acid, the amount of the degraded lignin is not sufficient with about 65-70%. Furthermore, the lignin accrues together with the degradation products from the hemicellulose, and the material flow has to be separated by means of distillation.

High rates of lignin degradation are obtainable mainly by means of alkaline methods. In the pulping methods applied so far, there have always been used high concentrations of sodium hydroxides at high temperatures. This, on the one side, causes a chemical modification of the lignin through condensation reactions, in this way reducing the quality of the lignin, and, on the other side, the lignin degradation cannot be decoupled from the hemicellulose degradation, this resulting in mixed product flows. This is also effective for the organosolv processes used so far.

An ideal biorefinery process, hence, should have rather high lignin degradation rates in combination with rather little use of chemical materials, it should produce a native lignin and maintain the hemicellulose degradation at a rather low level. Further, the low lignin content should promote downstream enzyme steps.

According to Beckmann and Liesche (Beckmann et al., 1921, *Lignin aus Winterroggenstroh; Zeitschrift für angewandte Chemie* 34:285-288) there were carried out tests, with the aim of preparing lignin from straw for the chemical analysis. The test conditions were as follows:
600 ml 96% alcohol+400 ml water+20 g NaOH (=2% solution)
alcohol:water=60:40.
dry substance (DS):liquid=1:8 (=11.11% DS)=125 g DS:1000 ml=20 g NaOH/125 g DS=16% NaOH/DS. Room temperature.

Under these conditions, there was obtained a lignin yield of 23.6%. A technical application under these conditions would, however, not be profitable at all.

A method for the selective solvent delignification in order to improve the subsequent fermentation of cellulose is known from U.S. Pat. No. 4,395,543 (Wang, Avgerinos). In this patent document there are, however, stated very wide ranges for all reaction parameters and reactants. A more detailed description of this method is to be found in scientific literature (Biotechnology and Bioengineering, Vol. XXV., pages 67-83 (1983)). According to this method, the pulping process is carried out with a large amount of base, based on the dry weight of the lignocellulosic material to be digested, this is 20 parts of base per 100 parts of the lignocellulosic material. Large alkaline amounts are disadvantageous in industrial applications.

Similarly, Philips & Goss (M. Philips and M. J. Goss (1934) *The Chemistry of Lignin; IX; Lignin from barley straw; J. Am. Chem. Soc.*, 56,2707) pulped barley straw upon precedent alcohol:benzene extraction with NaOH 22% (based on straw DS) at room temperature. The lignin yield was, similar to Beckmann, rather small. Only 6.8% of the lignin originally contained in the straw was released.

In Lawther 1997 there is reported an example of high lignin degradation but lacking selectivity. (J. M. Lawther, R.-C. Sun, W. B. Banks (1997) *Isolation and Characterization of organosolv lignin under alkaline condition from wheat straw; Int. J. of Polymer Analysis and Characterization*, 3:2, 159-175). Therein, organosolv lignin is obtained according to the following procedure:
By means of grinding wheat straw, there is produced a powder with a corn size of 0.25 mm (60 mesh screen) and pulped in ethanol:water=60:40, NaOH 80% based on straw dry weight, 75° C., 2 hours.
In this way, there was degraded 58.9% lignin, but simultaneously there were dissolved 61.6% hemicellulose.

This example demonstrates that in case of a too high NaOH concentration, the effect of ethanol, this is preventing the degradation of hemicellulose, is lost. The rather high lignin degradation in a reaction period of only 2 hours may be predominantly ascribed to the minimum corn size of the straw. The production of such small particles, however, is completely uneconomical due to the high energy consumption.

There has been found only one method for the preparation of lignin, wherein the disadvantages of known methods may be prevented.

In one aspect the present invention provides a method for the preparation of lignin from lignocellulosic material by pulping with alcohol, in particular with a $C_{1-4}$ alcohol, water and a base, in particular NaOH, at a temperature below 100° C., in particular from 40° C. to 90° C., in particular from 50° C. to 70° C., characterized in that 3 to 12 parts of base, in particular 4 to 10 parts of base, in particular preferably 5 to 8 parts of base, are used per 100 parts of the dry lignocellulosic material to be pulped.

A method provided by the present invention is herein in the following also designated as "method according to the present invention".

In the alkaline low-temperature methods comprised in the prior art for the delignification of straw, there were mainly used ethanol/water mixtures as solvents. The conditions selected therein are clearly different to the reaction conditions defined in the method according to the invention. In none of the methods mentioned, there was obtained an extensive decoupling of the lignin degradation from the degradation of hemicellulose. The decoupling of the lignin degradation from the degradation of hemicellulose results in a high selectivity of the method. This is only possible through the combination of features described in the method according to the present invention, leading to a special efficiency of the method.

In summary, the prior art knowledge in regard to the method found has to be evaluated as follows:

The substantial advantage of this method according to the present invention is the high delignification in combination with high selectivity. This is only obtainable by the selection of the parameter combinations selected in the present method according to the invention. These conditions are, in contrast to the prior art knowledge on ethanol/water mixtures, also economically acceptable. Alkaline amounts (i.e., NaOH), as used in regard to the used dry weight of the substrate in the prior art techniques, are per se not profitable, their recovery further requiring high energy efforts. Due to the high selectivity of the lignin degradation, the method according to the present invention is also more profitable than those described, as rather complex separation methods for the separation of large amounts of hemicellulose digestion products (xylose, xylo oligosaccharides) are prevented. The small amount of residual lignin remaining in the solid due to the high lignin degradation rates furthermore substantially improves the pre-requisites for an efficient enzymatic preparation of xylose or xylo oligosaccharides, respectively, from xylan as well as glucose from cellulose, which are, among others, also the objectives in the production of bioalcohol as well as other fermentation products. Through the selective and efficient pulping method according to the present invention, the entire value creation chain from lignin, xylan and cellulose is economically influenced in a positive way.

The lignin pulping in a method according to the present invention is carried out at a temperature not exceeding 100° C., preferably from 40° C. to 90° C., in particular preferably from 50° C. to 70° C.

In the method according to the present invention there is preferably used as a base an inorganic base such as an inorganic hydroxide, in particular a hydroxide of an alkali metal, i.e., KOH or preferably NaOH.

In a method according to the present invention there is preferably used as an alcohol an aliphatic alcohol such as a $C_{1-6}$ alcohol, in particular preferably a $C_{1-4}$ alcohol such as ethanol, isopropanol. In a preferred embodiment there is used ethanol, in another preferred embodiment there is used isopropanol as an alcohol.

Another substantial aspect of the method found consists in the fact that there has surprisingly been shown that the rentability obtainable through the ethanol/water mixtures under maintenance of the described parameters may still be increased by the use of isopropanol/water mixtures, by obtaining still higher lignin degradation rates with the same selectivity. The use of isopropanol/water mixtures for the delignification at temperatures not exceeding 100° C. has not been known so far and leads, in particular when the parameter combinations described in the invention are maintained, to advantageous results not obtained so far.

In another aspect the present invention provides the use of isopropanol as alcohol in a method for the preparation of lignin from lignocellulosic material, in particular in a pulping method, in particular, wherein the method is carried out in an alkaline surrounding, in particular the use of isopropanol as alcohol in a method according to the present invention.

In another aspect the present invention provides a method for the preparation of lignin from lignocellulosic material, characterized in that isopropanol is used as alcohol, in particular a pulping method, in particular, wherein the method is carried out in an alkaline surrounding, in particular a method according to the present invention.

Alcohol is present in an aqueous solution in the method according to the invention preferably in a range of 10 to 70% (vol/vol), i.e., 20 to 50% (vol/vol), preferably from 30 to 40% (vol/vol).

In the method according to the invention the solid content at the beginning of the pulping method is preferably 3-40% by weight, the lignocellulosic material in the aqueous solution is namely preferably in a material density of 3-40% by weight, such as 5-40% by weight, in particular 5-20% by weight.

The use of alcohol allows for the extensive decoupling of the lignin degradation from the degradation of the hemicellulose. With lignin degradation rates of >80% there are degraded at maximum 10% hemicellulose. This ratio by far exceeds the selectivity obtained in other methods.

In a method according to the present invention, the volume ratio of water to alcohol is in a range of not less than 10:90, in particular in a range from 10:90 to 90:10, in particular from 20:80 to 40:60, or in a range from 60:40 or above, in particular from 60:40 to 90:10. It has been found out, for example, that for a maximum lignin degradation using ethanol as alcohol, a ratio of water:ethanol of 60:40 to 80:20, in particular of 70:30 and for the maximum selectivity a ratio of water:ethanol of 30:70 to 50:80, in particular of 40:60, is advantageous.

As lignocellulosic material there is used organic material containing lignin, preferably annual plants such as (dry) grasses, or parts of grasses or hardwood, preferably grasses, straw, energy crops such as switch grass, elephant grass or abaca, sisal, bagasse, or untypical lignocellulose substrates such as glumes, i.e., lemmas such as husk rice, preferably straw, energy crops, bagasse or glumes, in particular preferably straw or bagasse, i.e. straw such as wheat straw.

Straw has a strongly hydrophobic surface, so that wetting with an aqueous solution is a problem. It has been shown that it is possible, by means of using alcohol, to introduce even without pressure the reaction solution into the pores of the substrate and to substitute the air present for the reaction solution. Furthermore it has been shown that with the selected reaction conditions alcohol accelerates the extraction of the digestion products from straw and that it contributes to maintaining the lignin digestion products in solution, whereas in contrast thereto alcohol reduces the solubility of the hemicellulose and the digestion products thereof and, hence, maintains the hemicellulose in the substrate.

In a method according to the present invention the pulping period is preferably 2 hours to 36 hours, in particular preferably 3 to 18 hours.

A method according to the present invention is carried out preferably so that the lignocellulose content of the pulp solution is kept in a range from 5 to 40% by weight, in particular from 10 to 20% by weight. The solid concentration ideal for a certain pulping objective may be determined by means of preliminary tests.

The lignin dissolved in the course of the pulping process in a method according to the present invention is preferably separated from the solid, for example by means of filtration, centrifugation. Due to the small lignin content the xylan remaining in the substrate may be degraded and prepared nearly completely in another pure product flow into sugars and/or oligosaccharides.

According to the further use of the products aimed for, there may be achieved through the combination of the parameters NaOH concentration, temperature, duration, material density and alcohol concentration either a maximum lignin yield of about 90% with little hemicellulose degradation (about 10%) or a lignin yield of about 70% with not more than 1% degradation of hemicellulose. Even in the case of a lignin degradation of 90% with about 10% degradation of hemicellulose, the selectivity of the method according to the invention by far exceeds the selectivity of the methods described so far.

By suitable selection of the concentration of the pulp components alcohol, water and base as well as the reaction parameters temperature, pulping duration and solid concentration for the respective lignocellulose to be digested, there may be established regression models for pulping data for the respective lignocellulose to be pulped, from which the optimum composition in terms of percentage of the pulp components and the optimum reaction parameters may be selected for the respective lignin content aimed for of the solid accruing upon pulping. The establishment of such regression models may be realized with the help of a statistical design of experiments.

The pulping parameters are preferably selected for the respective lignocellulose to be pulped in a way so that the highest value creation is achieved through the amount of the prepared lignin and the products of the solid prepared upon separation of the lignin solution. This means that the adjustment of the cited parameters is realized so that optimal amounts of higher-value products are prepared from the material pulped according to the present invention.

One of the preferred variants has the aim that the prepared lignin contains the lowest possible concentration of products originating in the digestion of hemicellulose.

In another aspect the present invention provides a method for achieving a delignification level aimed for of the solid prepared upon the separation of the liquid phase with the preparation of lignin from lignocellulose by means of pulping with alcohol, water and a base not exceeding 100° C., which is characterized in that in terms of percentage the composition of the three pulp components alcohol, water and base as well as the reaction parameters temperature, pulping duration and solid concentration respectively according to the lignin content aimed for is selected upon the pulping of the solid prepared upon separation of the liquid phase; preferably that there may be established regression models for pulping data for the respective lignocellulose to be pulped, from which the optimum composition in terms of percentage of the pulp components and the optimum reaction parameters may be selected for the respective lignin content aimed for of the solid accruing upon pulping, wherein the establishment of the regression models may be realized with the help of a statistical design of experiments.

EXAMPLE 1

Adjustment of the Lignin Yield and of the Selectivity of the Lignocellulose Pulp by Selection of Certain Pulping Parameters Wheat straw (21.0% by weight lignin content, 20.9% by weight xylan content—this corresponding to 238 g hydrolysed xylose per kg wheat straw) was reduced to a particle size of 2 mm by means of an ultracentrifuge mill. The straw was suspended in a mixture of water, ethanol and NaOH and then pulped while stirring at constant temperature. In the selected experiment design (central composed optimization plan) the solid content (SC) of the wheat stray was varied in the pulp solution between 5 and 8% by mass, the temperature between 30 and 70° C., the alkaline amount between 4 and 8% by weight based on the solid, the alcohol concentration of the pulp solution was adjusted between 0 and 80% (vol/vol), the pulping duration between one and 24 hours. Upon pulping, the remaining solid was separated from the pulp solution, and the solid yield, the lignin content of the solid as well as the lignin and saccharide content (xylose, total sugar) of the pulp solution were determined. The following examples were calculated from the regression equations of the experiment design:

1. Pulping at 5% FS, with 25% (vol/vol) ethanol in the pulp solution; duration 18 hours; temperature 70° C., alkaline amount 8% by weight.
   Solid yield: 68.5±2.3%
   Lignin content of the solid: 10.8±1.4%
   Delignification: 65±4%
   Xylose yield in the pulp solution: 11±2%
   Total sugar yield in the pulp solution: 9±1%
Under these conditions, there were dissolved from 100 g wheat stray 13.7±0.8 g lignin as well as 6.2±0.7 g sugar.

2. Pulping at 5% FS, with 80% (vol/vol) ethanol in the pulp solution; duration 18 hours; temperature 70° C., alkaline amount 8% by weight.
   Solid yield: 68.5±2.3%
   Lignin content of the solid: 12.6±1.1%
   Delignification: 59±3%
   Xylose yield in the pulp solution: 0%
   Total sugar yield in the pulp solution: 1%±1%
Under these conditions, there were dissolved from 100 g wheat stray 12.4±0.6 g lignin as well as 0.7±0.7 g sugar.

3. Pulping at 10% FS, with 40% (vol/vol) ethanol in the pulp solution; duration 18 hours; temperature 70° C., alkaline amount 8% by weight.
   Solid yield: 60.1±3.1%
   Lignin content of the solid: 7.9±1.0%
   Delignification: 78±6%
   Xylose yield in the pulp solution: 6±1%
   Total sugar yield in the pulp solution: 6±1%
Under these conditions, there were dissolved from 100 g wheat stray 16.4±1.3 g lignin as well as 4.2±0.7 g sugar.

4. Pulping at 10% FS, with 60% (vol/vol) ethanol in the pulp solution; duration 18 hours; temperature 70° C., alkaline amount 8% by weight.
   Solid yield: 60.1±3.1%
   Lignin content of the solid: 8.2±1.1%
   Delignification: 75±5%
   Xylose yield in the pulp solution: 1.0±0.5%
   Total sugar yield in the pulp solution: 2±0.6%

Under these conditions, there were dissolved from 100 g wheat stray 15.8±1.18 g lignin as well as 1.4±0.4 g sugar.

EXAMPLE 2

As in example 1, wheat stray with a particle size of 2 mm was used. The wheat stray was suspended in a mixture of isopropanol, water and NaOH and pulped while stirring at a constant temperature of 70° for 18 hours. The solid content in the pulp solution was 5 percent by mass. In comparison, there were carried out pulping processes with 30% (vol/vol) as well as also with 60% (vol/vol) isopropanol. The alkaline amount was 8% by weight based on the solid.

Pulping with 30% (vol/vol) isopropanol:
Solid yield: 69.5%
Delignification: 93%
Xylose yield in the pulp solution: 8.3%

Under these conditions, there were dissolved from 100 g wheat stray 19.5 g lignin as well as 2.0 g xylose.

Pulping with 60% (vol/vol) isopropanol:
Solid yield: 68.2%
Delignification: 63%
Xylose yield in the pulp solution: 0.86%

Under these conditions, there were dissolved from 100 g wheat stray 13.2 g lignin as well as 0.2 g xylose.

The invention claimed is:

1. A method, comprising:
providing a lignocellulosic material,
wherein the lignocellulosic material is an organic material containing lignin,
pulping the lignocellulosic material with an alcohol, a water and an alkali at a temperature from 40° C. to below 100° C. for a time period of between 2 hours and 36 hours to produce a pulp solution,
wherein 3 to 8 parts of the alkali are used per 100 parts of a dry weight of the lignocellulosic material, and
wherein the pulp solution has a sugar content of 10 percent or less.

2. The method according to claim 1, wherein a ratio of the water to the alcohol is in a range from 10:90 to 90:10.

3. The method according to claim 1, wherein the lignocellulosic material is selected from a group consisting of: straw, energy crop, and any combination thereof.

4. The method according to claim 1, wherein the alcohol is a $C_{1-4}$ alcohol.

5. The method according to claim 4, wherein the $C_{1-4}$ alcohol is isopropanol.

6. The method according to claim 4, wherein the $C_{1-4}$ alcohol is ethanol.

7. The method according to claim 1, wherein the temperature is between 40° C. and 90° C.

8. The method according to claim 1, wherein the temperature is between 50° C. and 70° C.

9. The method according to claim 1, wherein 5 to 8 parts of the alkali are used per 100 parts of the dry lignocellulosic material.

10. The method according to claim 1, wherein a ratio of the water to the alcohol ranges from 20:80 to 40:60.

11. The method according to claim 1, wherein a ratio of the water to the alcohol ranges from 60:40 to 90:10.

12. The method according to claim 1, wherein the time period ranges between 10 to 24 hours.

13. The method according to claim 1, wherein the lignocellulosic material is energy crops.

14. The method according to claim 1, wherein the lignocellulosic material is elephant grass.

15. The method according to claim 1, wherein the lignocellulosic material is switchgrass.

16. The method according to claim 3, wherein the energy crop comprises one of: elephant grass, switchgrass, glumes, and any combination thereof.

17. The method according to claim 16, wherein in the glumes are lemnas.

18. The method according to claim 1, wherein the alkali is NaOH.

* * * * *